United States Patent
Richard et al.

(10) Patent No.: US 11,518,220 B2
(45) Date of Patent: Dec. 6, 2022

(54) SUN VISOR AND METHOD OF ASSEMBLING A SUN VISOR

(71) Applicant: GRUPO ANTOLIN INGENIERIA, S.A.U., Burgos (ES)

(72) Inventors: Stephane Richard, Burgos (ES); Alain Philippe, Burgos (ES)

(73) Assignee: GRUPO ANTOLIN INGENIERIA, S.A.U., Burgos (ES)

( * ) Notice: Subject to any disclaimer, the term of this patent is extended or adjusted under 35 U.S.C. 154(b) by 448 days.

(21) Appl. No.: 16/716,282

(22) Filed: Dec. 16, 2019

(65) Prior Publication Data
US 2020/0189364 A1    Jun. 18, 2020

(51) Int. Cl.
*B60J 3/02*    (2006.01)

(52) U.S. Cl.
CPC .................. *B60J 3/0282* (2013.01)

(58) Field of Classification Search
CPC ....... B60J 3/0282; B60J 3/0278; B60J 3/0204
USPC ................. 359/844; 296/97.1, 97.5
See application file for complete search history.

(56) References Cited

U.S. PATENT DOCUMENTS

| | | | | |
|---|---|---|---|---|
| 4,685,723 A * | 8/1987 | Canadas | ............... | B60J 3/0282 |
| | | | | 296/97.5 |
| 4,711,483 A * | 12/1987 | Gulette | ................. | B60J 3/0282 |
| | | | | 296/97.5 |

FOREIGN PATENT DOCUMENTS

JP          5485002 B2 *   5/2014

* cited by examiner

*Primary Examiner* — Jason S Morrow
*Assistant Examiner* — Wenwei Zhou

(57) ABSTRACT

A sun visor comprises a sun visor body (2) and a vanity mirror assembly (1) comprising a vanity mirror (11) mounted on a support (12). The sun visor comprises a first set of clips (31, 32) configured for snap-fit connection of the vanity mirror assembly (1) onto the sun visor body (2) so that the vanity mirror assembly (1) is held firmly against the sun visor body (2) by the first set of clips, and a second set of clips (41, 42; 51, 52) configured for snap-fit connection of the vanity mirror assembly (1) onto the sun visor body (2) allowing for movement of the vanity mirror assembly (1) in relation to the sun visor body (2). If the snap-fit connection by the first set of clips fails after an impact, the vanity mirror assembly may remain attached to the sun visor body by the second set of clips.

19 Claims, 3 Drawing Sheets

SUN VISOR AND METHOD OF ASSEMBLING A SUN VISOR

TECHNICAL FIELD

The present invention relates to sun visors for vehicles, such as for cars and trucks. More specifically, the present invention relates to vehicle sun visors including a so-called vanity mirror.

STATE OF THE ART

Vehicle sun visors incorporating a mirror, often referred to as a vanity mirror, are well known in the art. Nowadays, vanity mirrors are generally provided on some kind of support that is clipped onto the sun visor body during assembly. The sun visor body can for example comprise one single core component or skeleton (in which case this core is nowadays generally covered by two cushion-like members or pads which define the outer shape of the sunvisor and generally are of a light-weight material with a softer touch, frequently expanded polypropylene), or two plastic shells joined together to form the sun visor body (sun visors with this kind of structure are sometimes referred to as a twin-shell sun visors). The sun visor body typically includes some kind of recess or other configuration that accommodates the vanity mirror assembly comprising the vanity mirror and its support. Typically, the vanity mirror assembly is clipped onto the sun visor body by one or more clips designed for snap-fit connection, which allows for easy and rapid assembly of the vanity mirror assembly onto the sun visor body, thereby contributing to keep the assembly costs down.

Cost is one of the critical aspects to consider when designing automobile components. Another critical aspect is safety. In the context of sun visors, one aspect to consider is what may happen to the vanity mirror in the case of an impact. It is desirable that the vanity mirror remain attached to the sun visor body also after an impact. A problem in the context of snap-fitted vanity mirror assemblies is that the sun visor body may become deformed as a result of the impact, which may affect the snap-fit connection so that the clips may be released, disconnecting the vanity mirror assembly from the sun visor body.

It is known in the art to use the electrical wires that power the light sources of some vanity mirror assemblies as a tether means for retaining the vanity mirror assembly in case the clips that fix it to the sun visor body are disengaged, for example, in the case of a crash. However, this requires adaptation of the way in which the electrical system is arranged, and is only implementable in sun visors which feature such an electrical system.

CN-106335348-A suggests another way of ensuring that the vanity mirror remains attached to the sun visor body also after an impact, namely, by providing flexible connecting members that can be inserted into respective openings in the sun visor body prior to the final attachment of the vanity mirror assembly onto the sun visor body using clips or other attachment means. The end portions of the flexible connecting members are shaped so as to remain within the sun visor body if the vanity mirror assembly is released from the sun visor body as the result of the crash, so that the vanity mirror assembly will remain attached to the sun visor body via these two flexible connecting members after the crash.

DESCRIPTION OF THE INVENTION

It has, however, been observed that that kind of flexible connecting members may be sup-optimal from an assembly perspective, as they will need to be carefully introduced into the respective openings in the sun visor body prior to the final attachment of the vanity mirror assembly onto the sun visor body. Additionally, sufficient space has to be allocated inside the sun visor body so that these flexible connecting members can enter without problems during assembly. Additionally, and although the vanity mirror assembly will remain linked to the sun visor body via said flexible connecting members also after a crash, the flexible connecting members may allow for a certain substantial displacement of the vanity mirror assembly in relation to the surface of the sun visor body, a displacement that may involve a certain increase in the risk of damage to the occupants of the vehicle.

A first aspect of the invention relates to a sun visor comprising a sun visor body and a vanity mirror assembly, the vanity mirror assembly comprising a vanity mirror mounted on a support, wherein the sun visor comprises clips for snap-fit connection of the vanity mirror assembly onto the sun visor body, wherein the clips comprise a first set of clips configured for snap-fit connection of the vanity mirror assembly onto the sun visor body so that the vanity mirror assembly is held firmly against the sun visor body by the first set of clips. The clips further comprise a second set of clips configured for snap-fit connection of the vanity mirror assembly onto the sun visor body in a manner that does not prevent movement of the vanity mirror assembly in relation to the sun visor body, that is, that allows for movement of the vanity mirror assembly in relation to the sun visor body if it were not for the fact that such movement is prevented by the first set of clips.

That is, a first set of clips is arranged for a firm connection of the vanity mirror assembly onto the sun visor body, preferably by elastic biasing of the vanity mirror assembly towards the sun visor body (and vice-versa), or at least by providing for a sufficiently tight connection that prevents any movement of the vanity mirror assembly in relation to the sun visor body during normal use, as such movement may give rise to undesired noise. It is often important that during normal use, there be no play between the vanity mirror assembly and the sun visor body, and this is ensured by the first set of clips. The second set of clips likewise provide for snap-fit connection between the sun visor body and the vanity mirror assembly, but differently from the first set of clips, the snap-fit connection by the second set of clips allows for (that is, does not prevent) movement of the vanity mirror assembly in relation to the sun visor body, that is, the second set of clips provides for a certain play between the two components allowed by the configuration of the clips of the second set of clips. The clips of the second set of clips may comprise male and female parts that are configured to allow for a certain extent of relative movement due to the geometrical configuration of the parts, and an additional amount of relative movement due to flexibility of the male and/or female parts, allowing for a certain amount of deformation of the male and/or female parts prior to release of the male part from the female part. Thus, in some embodiments, with the male part inserted into the female part, the male part will be able to move towards an exit in the female part until it reaches a position where deformation of the male and/or female part will start to take place. This deformation will preferably not begin until a substantial deformation of the sun visor body has occurred and/or until the first clips have been unclipped. Also, this gap or play that allows for a relative movement between the male and female parts prior to deformation of any of them is also helpful to ensure complete insertion of the male part into the female part during assembly, thereby reducing the risk of incomplete insertion. The flexibility of the male and/or female parts of the clips of the second set of clips preferably allows for a significant deformation of these parts prior to release of the male part from the female part. Now, it is not necessary to design the clips of the second set of clips so as to require a substantial force for releasing the male part from the female part: it is generally more preferable to design the clips of the second set of clips to allow for a substantial deformation prior to release of the male part from the female part.

In this case, should the snap-fit connection provided by the first set of clips fail as the result of for example a crash or other impact, the second set of clips will serve to maintain the vanity mirror assembly attached to the sun visor body, although in a looser manner. The fact that the connection by the second set of clips is looser (that is, less tight) than the connection by the first set of clips implies that it is less likely that also the connection by the second set of clips will fail in the event that the connection established by the first set of clips fails following an impact resulting in deformation of the sun visor.

The fact that both sets of clips are clips for snap-fit connection makes assembly easy: the vanity mirror assembly can be attached to the sun visor body by carrying out a relative movement between the two components, first establishing a snap-fit via the second set of clips, then establishing the snap-fit connection via the first set of clips.

The invention refers to the sun visor both in its assembled and in its disassembled state, that is, both to the sun visor with the vanity mirror assembly mounted on the sun visor body, and to the sun visor body and the vanity mirror assembly separate from each other.

In some embodiments of the invention, the second set of clips is configured for allowing movement of the vanity mirror assembly in relation to the sun visor body with an amplitude in the range of 0.5-10 mm in a direction substantially perpendicular to the sun visor body, such as with an amplitude in the range of 1-5 mm in a direction substantially perpendicular to the sun visor body, without deformation of the respective clips. The expression "substantially perpendicular to the sun visor body" refers to a direction that is substantially perpendicular to the central plane of the sun visor body which is substantially parallel with the main surfaces of the sun visor body.

That is, the second set of clips is designed, configured or arranged so that when the first set of clips is not complying with its function of retaining the vanity mirror assembly firmly against the sun visor body, a certain freedom of movement is allowed. The freedom of movement may be equal to or larger than 0.5 or 1 mm, such as equal to or larger than 2, 3, 4 or 5 mm, but is preferably not too large, for example, it is preferably equal to or smaller than 20, 15 or 10 mm, such as equal to or smaller than 7 or 5 mm. A relatively small movement is sometimes preferred in order to minimize the risk that the vanity mirror assembly will enter into contact with an occupant of the vehicle or with other components of the vehicle in the case of a crash, and also to minimize the extension of the clip parts in the direction of the movement. Also, a movement in excess of 5 mm, 7 mm or 10 mm may be disadvantageous as it may require a very substantial extension of the clips in the direction perpendicular to the sun visor body, and thus require an undesirably thick sun visor body. However, the freedom of movement should preferably not be too small, as a very small freedom of movement may have the result that in the case of an impact deforming the sun visor, the attachment provided by the second set of clips might likewise fail due to the deformation.

In some embodiments of the invention, the first set of clips is configured for biasing the vanity mirror assembly against the sun visor body. That is, after producing the snap-fit connection via the first set of clips, the first set of clips or at least some members thereof remain elastically deformed (in many cases, just slightly elastically deformed), thereby forcing the vanity mirror assembly against the sun visor body so that the vanity mirror assembly exerts a force on the sun visor body and vice-versa. This arrangement is advantageous to ensure that the vanity mirror assembly will actually be held firmly against the sun visor body, not allowing any relative movement between the two components during normal use, also taking the manufacture tolerances into account. Normal use typically refers to the vehicle with the sun visor being driven, whereby the vanity mirror assembly should preferably not move in relation to the sun visor body, for example, to avoid the generation of noise.

In some embodiments of the invention, the second set of clips is not configured for biasing the vanity mirror assembly against the sun visor body. That is, contrary to the first set of clips, the second set of clips is not configured for biasing the vanity mirror assembly against the sun visor body, that is, in the absence of any action of the first set of clips, the second set of clips merely maintain the vanity mirror assembly mechanically connected to the sun visor body, but it does not force the vanity mirror assembly against the sun visor body so that the vanity mirror assembly exerts a force on the sun visor body. Rather, the vanity mirror assembly will remain moveable in relation to the sun visor body, for example, so that it can be moved towards and from the sun visor body with a movement featuring a certain amplitude, preferably not outside the range of 1-10 mm.

In some embodiments of the invention, the second set of clips comprises at least one clip, preferably a plurality of clips, comprising a male part and a female part, the male part comprising an end portion arranged to be retained within the female part, wherein the end portion is displaceable within the female part (that is, if it were not for the clips of the first set of clips) in a direction substantially perpendicular to the sun visor body. That is, if it were not for the first set of clips, the vanity mirror assembly would be displaceable towards and from the sun visor body with an amplitude delimited, at least, by the capability of movement of the end portion of the male part within the female part, which is preferably in the range of 0.5-5 mm prior to any deformation of the male and/or female parts. Now, of course, also other aspects may delimit the way in which the vanity mirror assembly will be able to move in relation to the sun visor body.

In some embodiments, the end portion is displaceable within the female part in a direction substantially perpendicular to the sun visor body without deformation of the male part or of the female part. This displacement without deformation is preferably at least 0.5 mm or 1 mm and preferably equal to or less than 10 mm, preferably equal to or less than 5, 4, 3 or 2 mm. For example, a preferred range for movement without deformation is 0.5-5 mm.

In some embodiments, the male part and/or the female part are/is flexible, allowing for deformation of the corresponding part(s) prior to release of the male part from the female part. This capability of deformation without rupture serves to enhance the capacity of the clips of the second set of clips to withstand also very substantial deformations of the sun visor body without the male part being released from the female part. For example, in some embodiments, the deformation of the male and/or female parts may take place while the corresponding part of the vanity mirror assembly moves in relation to corresponding part of the sun visor body (that is, while the anchoring points of the male and the female parts move in relation to each other) by equal to or more than 1, 2, 3, 4, 5, 6, 7, 8, 9 or 10 mm, just to give examples of suitable ranges of displacement prior to release of the male part from the female part.

In some embodiments of the invention, the end portion of the male part features a beveled portion for facilitating insertion of the male part into the female part, and a proximal portion that prevents withdrawal of the end portion of the male part out of the female part.

In some embodiments of the invention, the male part is not hollow.

In some embodiments of the invention, the male part is hollow. In some of these embodiments of the invention, the female part includes a member arranged to enter into the male part. This member can act as a centering means or guide means for the male part during and after assembly.

In some embodiments of the invention, the end portion of the male part is compressible to facilitate insertion of the male part into the female part, and retention of the male part in the female part after insertion. That is, if the end portion of the male part is compressible, the end portion can be compressed during insertion of the male part into the female part, and after insertion the end portion can expand to its original configuration within the female part, thus enhancing retention of the male part within the female part.

In some embodiments of the invention, the clips of the second set of clips are more flexible than the clips of the first set of clips. This greater flexibility does not prejudice the firm connection between the sun visor body and the vanity mirror assembly during normal use, as the second set of clips is not responsible for this firm connection, which is achieved by the first set of clips. Also, this greater flexibility even further reduces the risk that also the second snap-fit connection (achieved by the second set of clips) may fail should the connection due to the first set of clips fail due to deformation of the sun visor. That is, the flexibility even further enhances the post-crash performance of the second set of clips.

The clips, and the male and female parts thereof, can be part of the support for the vanity mirror or part of the sun visor body, or distributed between the support and the sun visor body, according to the preferences of the skilled person. That is, in some embodiments, all male parts are arranged on the sun visor body whereas all female parts are arranged on the support for the vanity mirror, in other embodiments it is the other way around, and in some embodiments some of the male parts are arranged on the vanity mirror support and the other male parts are arranged on the sun visor body. This is applicable both to the first and the second set of clips.

In some embodiments of the invention, the sun visor body is a twin-shell sun visor body comprising two interconnected shells, one of the shells being configured for accommodating the vanity mirror assembly. The clip parts that are part of the vanity mirror support may interact with one of the shells or with both shells.

In some embodiments of the invention, the sun visor body comprises a single molded core component having to main surfaces, the sun visor further comprising two pads such as foam pads (for example, of expanded polypropylene), one of the foam pads being attached to each of the main surfaces of the molded core component.

When fully assembled the sun visor generally comprises some kind of cover or coating, covering most of the shells or foam pads, respectively, but leaving the vanity mirror or most of the vanity mirror visible.

Another aspect of the invention relates to a method of assembling a sun visor as described above, the method comprising bringing the vanity mirror assembly into contact with the sun visor body so that the vanity mirror assembly is clip connected to the sun visor body by a first snap-fit connection involving the second set of clips and a second snap-fit connection involving the first set of clips, wherein the vanity mirror assembly is first connected to the sun visor body by the first snap-fit connection involving the second set of clips whereafter the vanity mirror assembly is still moveable in relation to the sun visor body, and wherein the vanity mirror assembly is thereafter further connected to the sun visor body by the second snap-fit connection involving the first set of clips, whereafter the vanity mirror assembly is no longer moveable in relation to the sun visor body.

That is, in many embodiments the assembly of the vanity mirror assembly onto the sun visor body will involve a two-step procedure, whereby a first snap-fit connection is established by the second set of clips, typically by male members thereof penetrating into the female members, and followed by a second snap-fit connection stage where the first set of clips are interlocked. After the first snap-fit connection the vanity mirror assembly is still moveable in relation to the sun visor body, typically with a certain play as explained above, that is, for example, with a play that is, inter alia, limited by the amplitude with which the male parts of the second set of clips are moveable within the female parts. Once the second snap-fit connection has been established, the vanity mirror assembly is firmly held against the sun visor body by the first set of clips, thereby avoiding, for example, movement thereof while the vehicle is being driven. This is typically achieved by the clips of the first set of clips that bias the vanity mirror assembly against the sun visor body, pressing the two components against each other and preventing any relative movement between them.

BRIEF DESCRIPTION OF THE DRAWINGS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

DESCRIPTION OF A WAY OF CARRYING OUT THE INVENTION

Figure 1:
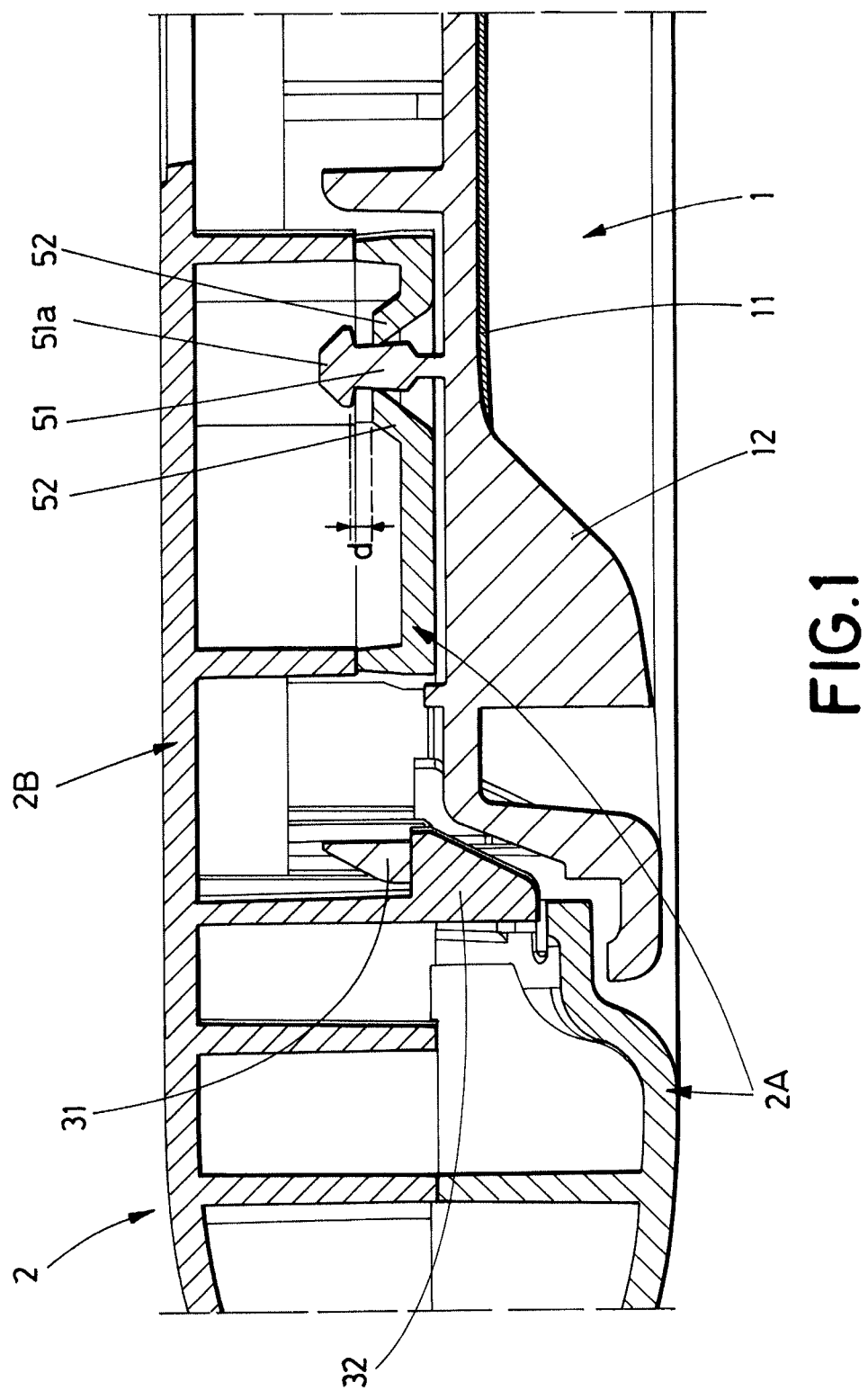
FIG. 1 is a schematic cross sectional view of a portion of a sun visor according to an embodiment of the invention.

FIG. 1 schematically illustrates how a vanity mirror assembly 1 comprising a vanity mirror 11 and a support 12 is attached to a sun visor body 2. In this specific embodiment, the sun visor is a so-called twin-shell sun visor featuring a sun visor body 2 made up of two shells 2A and 2B, a first one of the shells 2A featuring a recess for the vanity mirror assembly 1, whereas the second one of the shells 2B forms the other side of the sun visor body.

The support 12 is firmly held and biased against the sun visor body 2 by a first set of clips configured for snap-fit connection. One clip of the first set of clips is schematically illustrated in FIG. 1 and comprises a first clip part 31 that is part of the support 12 for the vanity mirror, and a second clip part 32 that is part of the sun visor body 2, in this specific embodiment, of the second shell 2B of the sun visor body 2. The first set of clips can be configured in any appropriate manner, as long as the clips provide for a tight and preferably tensioned attachment between the support 12 and the sun visor body 2, biasing the two components towards each other so as to prevent any relative movement between the two components, for example, so as to avoid noise due to vibration while the vehicle in which the sun visor is (to be) mounted is driven. Thus, the two clip parts 31 and 32 of the clips of the first set of clips are preferably arranged to become pre-tensioned when the vanity mirror assembly is mounted to the sun visor body. In many embodiments of the invention, the first set of clips can be implemented in accordance with one of the many known systems for attaching a sun visor assembly to a sun visor body.

FIG. 1 additionally illustrates one of the clips of the second set of clips, comprising a male part 51 and a female part 52. As schematically illustrated in FIG. 1, the male part 51 comprises an end portion 51a that is arranged within the female part 52 and that is not abutting against the female part 52 in the position of the male part shown in FIG. 1, that is, the position in which the support 12 is biased against the sun visor body 2 by the first set of clips. In this position, the clips of the second set of clips do not prevent the relative movement between the support 12 and the sun visor body 2; this relative movement is prevented by the clips of the first set of clips, including the clip formed by the two clip parts 31 and 32. In many embodiments of the invention, the first set of clips includes 2-10 clips, such as 4-6 clips. Also the second set of clips can in many embodiments typically include 2-10 clips, such as 4-6 clips.

In the embodiment shown in FIG. 1, the clip of the first set of clips comprises one part 32 that is part of the second shell 2B, and one part 31 that is part of the support 12. The clip of the second set of clips comprises one part 52 that is part of the first shell 2A, and another part 51 that is part of the support 12. However, any other distribution of the clip parts between the first and second shells is obviously within the scope of the invention. Also, the male and female parts of the clips can be distributed in any suitable manner between the sun visor body 2 and the support 12.

Figure 2A:
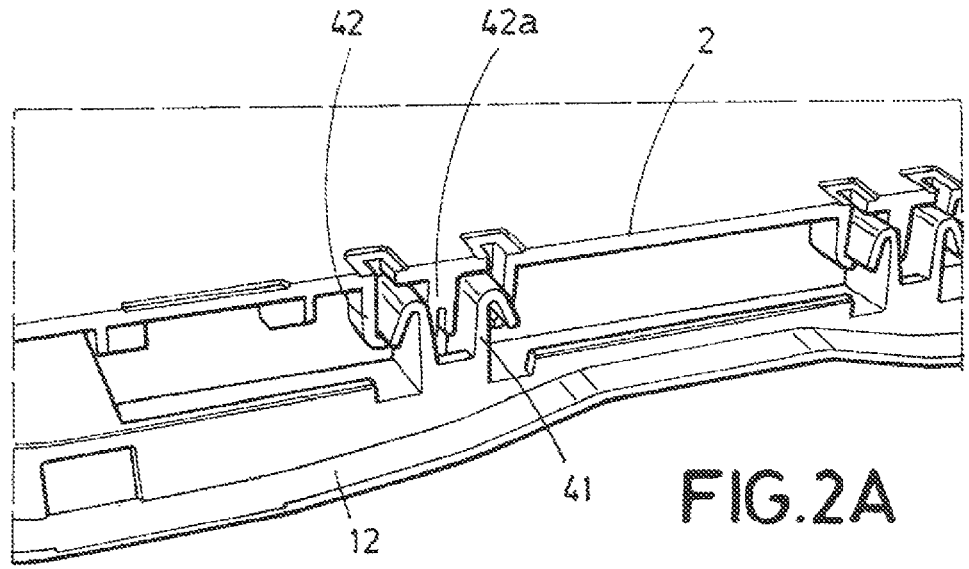
FIG. 2A is a schematic perspective cross sectional view of another portion of the sun visor according to the same embodiment of the invention.
Figure 2B:
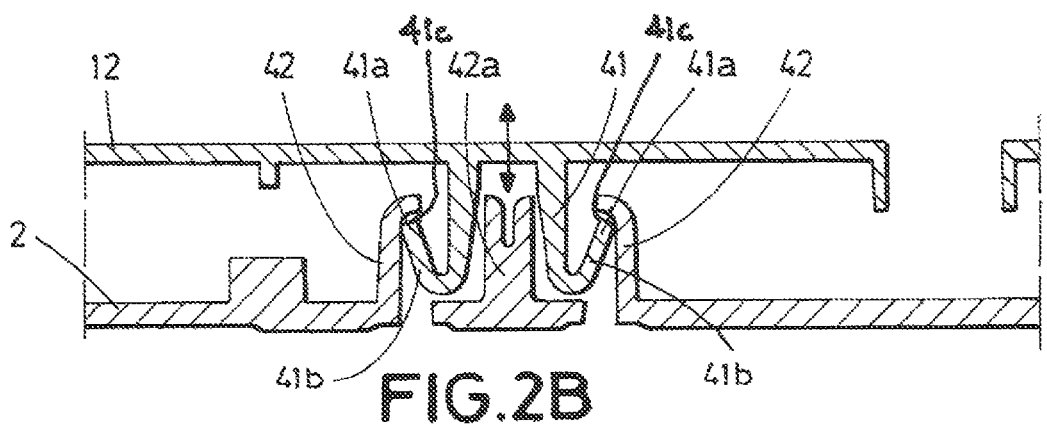
FIGS. 2B and 2C are schematic cross sectional views of part of the portion shown in FIG. 2A.
Figure 2C:
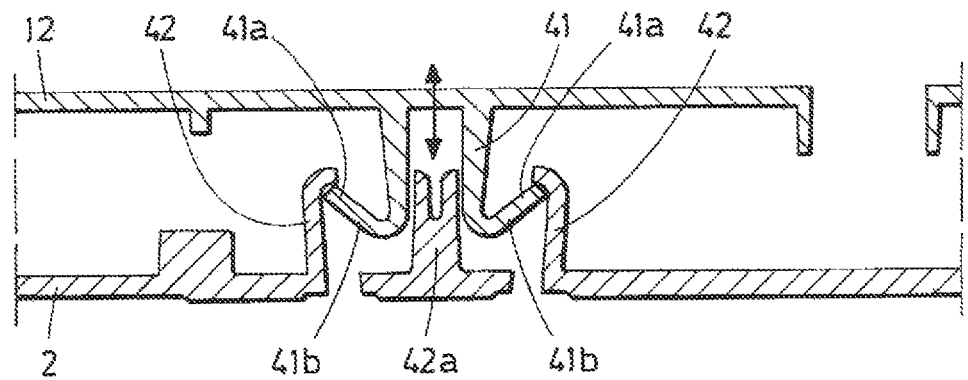

FIGS. 2A-2C schematically illustrate another one of the clips of the second set of clips, comprising a female part 42 (in this embodiment, the female part of the clip is part of the sun visor body 2, but in alternative embodiments it may be part of the vanity mirror support 12) and a male part 41 (in the illustrated embodiment, the male part is part of the vanity mirror support 12). The end portion 41a of the male part includes a beveled portion 41b that simplifies entry of the male part 41 into the female part 42, under radial compression of the elastic end portion 41a, whereby the end portion 41a expands again after insertion, so that a proximal portion 41c of the end portion prevents the end portion from exiting the female part 42. Now, the end portion 41a is free to move within the female part 42, in the direction towards and from the sun visor body, as schematically illustrated by the double arrow in FIGS. 2B and 2C. This movement has preferably an amplitude in the range of 0.5-10 mm, such as 0.5-5 mm, without need for deformation of the male part 41 or the female part 42. The female part includes a guide member 42a that is aligned with the hollow interior of the male part 41.

Figure 3A:
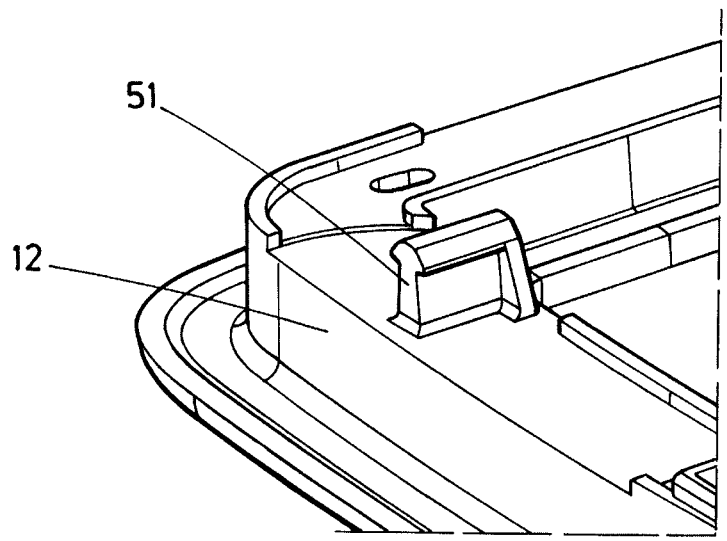
FIG. 3A is a schematic perspective view of a portion of the support for the vanity mirror, according to the same embodiment of the invention.
Figure 3B:
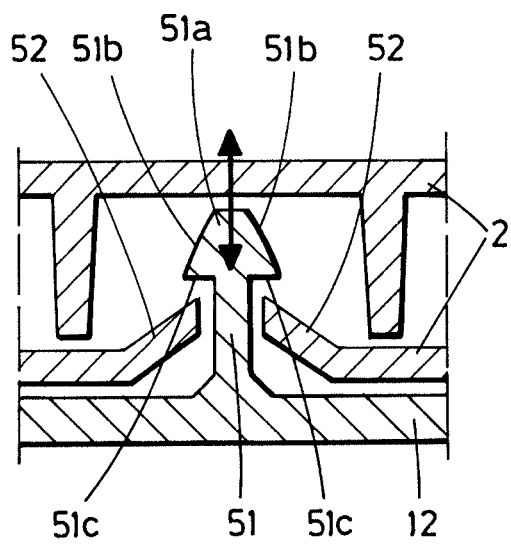
FIGS. 3B and 3C are schematic cross sectional views of part of the sun visor according to the embodiment of the invention, including the male portion of the clip shown in FIG. 3A and a corresponding female portion.
Figure 3C:
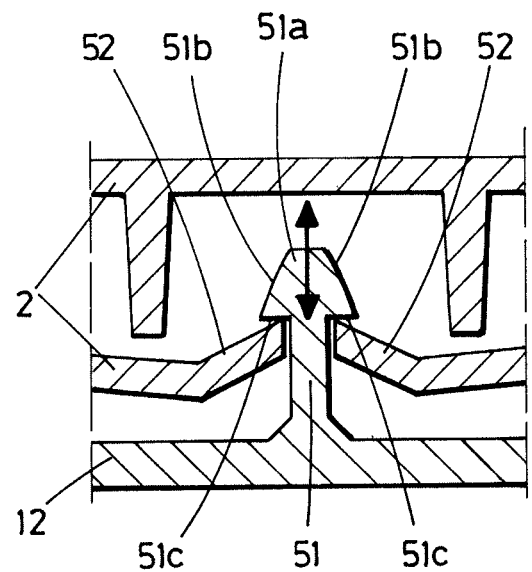

FIGS. 3A-3C schematically illustrate the clip 51, 52 of the second set of clips shown in FIG. 1. In some embodiments, all of the clips of the second set of clips have approximately the same configuration, but in the illustrated embodiment, clips with different configurations are used. In the case of the clip shown in FIGS. 3A-3C, the male part 51 (which in the illustrated embodiment is part of the support 12 for the vanity mirror, whereas the female part is part of the sun visor body 2) has a head or end portion 51a with a beveled portion 51b to facilitate insertion into the female part 52, and a proximal portion 51c that prevents withdrawal of the end portion 51a out of the female part 52 after insertion. In this case, the male part is compact and does not substantially compress during insertion; instead, the female part 52 has been designed to allow for elastic deformation during insertion of the male part 51. Once inserted, the male part 51 is moveable in relation to the female part 52, that is, the end portion 51a is moveable back and forth within the female part 52, as illustrated by the double arrow in FIGS. 3B and 3C.

In the case of the clips shown in FIGS. 2A-3C, both the male and the female parts feature a substantial flexibility. Thus, during deformation of the sun visor body 2, the end portion 41a, 51a of the male part 41, 51 moves towards the exit out of the female part 42, 52, first without any deformation of the male or female parts, until the proximal portion 41c, 51c of the male part abuts against an inner retention surface of the female part. This first part of the movement may correspond to a distance d (schematically illustrated in FIG. 1) in the order of 0.5-10 mm, such as 0.5-5 mm. As from there, and due to the flexibility of the male and female parts, the support 12 and sun visor body 2 can continue to move away from each other, under deformation of the male and female parts, thereby delaying and possibly preventing a release of the male part from the female part, at least in what regards some of the clips of the second set of clips. In this way, the risk of the vanity mirror assembly being completely released from the sun visor body is further reduced.

In this text, the term "comprises" and its derivations (such as "comprising", etc.) should not be understood in an excluding sense, that is, these terms should not be interpreted as excluding the possibility that what is described and defined may include further elements, steps, etc.

Unless otherwise specified, any indicated ranges include the recited end points.

The invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. A sun visor comprising a sun visor body (2) and a vanity mirror assembly (1), the vanity mirror assembly (1) comprising a vanity mirror (11) mounted on a support (12), wherein the sun visor comprises clips (31, 32; 41, 42; 51, 52) for snap-fit connection of the vanity mirror assembly (1) onto the sun visor body (2), wherein the clips comprise a first set of clips (31, 32) configured for snap-fit connection of the vanity mirror assembly (1) onto the sun visor body (2) so that the vanity mirror assembly (1) is held firmly against the sun visor body (2) by the first set of clips (31, 32), and further comprising a second set of clips (41, 42; 51, 52) configured for snap-fit connection of the vanity mirror assembly (1) onto the sun visor body (2) in a manner allowing movement of the vanity mirror assembly (1) in relation to the sun visor body (2) with an amplitude in the range of 0.5-10 mm in a direction substantially perpendicular to the sun visor body (2) without deformation of the second set of clips.

2. The sun visor according to claim 1, wherein the second set of clips (41, 42; 51, 52) is configured for allowing movement of the vanity mirror assembly (1) in relation to the sun visor body (2) with an amplitude in the range of 1-5 mm in a direction substantially perpendicular to the sun visor body (2), without deformation of the clips of the second set of clips.

3. The sun visor according to claim 1, wherein the first set of clips (31, 32) is configured for biasing the vanity mirror assembly (1) against the sun visor body (2).

4. The sun visor according to claim 1, wherein the second set of clips (41, 42; 51, 52) is not configured for biasing the vanity mirror assembly (1) against the sun visor body (2).

5. A sun visor comprising a sun visor body (2) and a vanity mirror assembly (1), the vanity mirror assembly (1) comprising a vanity mirror (11) mounted on a support (12), wherein the sun visor comprises clips (31, 32; 41, 42; 51, 52) for snap-fit connection of the vanity mirror assembly (1) onto the sun visor body (2), wherein the clips comprise a first set of clips (31, 32) configured for snap-fit connection of the vanity mirror assembly (1) onto the sun visor body (2) so that the vanity mirror assembly (1) is held firmly against the sun visor body (2) by the first set of clips (31, 32), and further comprising a second set of clips (41, 42; 51, 52) configured for snap-fit connection of the vanity mirror assembly (1) onto the sun visor body (2) in a manner that does not prevent movement of the vanity mirror assembly (1) in relation to the sun visor body (2), the second set of clips (41, 41; 51, 52) comprising at least one clip having a male part (41; 51) and a female part (42; 52), the male part having an end portion (41a; 51a) arranged to be retained within the female part (42; 52), wherein the end portion (41a; 51a) is displaceable within the female part (42; 52) in a direction substantially perpendicular to the sun visor body (2).

6. The sun visor according to claim 5, wherein the end portion (41a; 51a) is displaceable within the female part (42; 52) in a direction substantially perpendicular to the sun visor body (2) without deformation of the male part (41; 51) or of the female part (42; 52).

7. The sun visor according to claim 5, wherein the male part (41; 51) and/or the female part (42; 52) are/is flexible, allowing for deformation of the corresponding part (41, 42; 51, 52) prior to release of the male part from the female part.

8. The sun visor according to claim 5, wherein the end portion (41a; 51a) of the male part (41; 51) features a beveled portion (41b; 51b) for facilitating insertion of the male part (41; 51) into the female part (42; 52), and a proximal portion (41c; 51c) that prevents withdrawal of the end portion (41a; 51a) of the male part (41; 51) out of the female part (42; 52).

9. The sun visor according to claim 5, wherein the male part (51) is not hollow.

10. The sun visor according to claim 5, wherein the male part (41) is hollow.

11. The sun visor according to claim 10, wherein the female part (42) includes a member (42a) arranged to enter into the male part (41).

12. The sun visor according to claim 5, wherein the end portion (41a) of the male part (41) is compressible to facilitate insertion of the male part (41) into the female part (42), and retention of the male part (41) in the female part (42) after insertion.

13. The sun visor according to claim 1, wherein the clips (41, 42; 51, 52) of the second set of clips are more flexible than the clips of the first set of clips.

14. A method of assembling a sun visor comprising a sun visor body (2) and a vanity mirror assembly (1), the vanity mirror assembly (1) comprising a vanity mirror (11) mounted on a support (12), wherein the sun visor comprises clips (31, 32; 41, 42; 51, 52) for snap-fit connection of the vanity mirror assembly (1) onto the sun visor body (2), wherein the clips comprise a first set of clips (31, 32) configured for snap-fit connection of the vanity mirror assembly (1) onto the sun visor body (2) so that the vanity mirror assembly (1) is held firmly against the sun visor body (2) by the first set of clips (31, 32), the clips further comprise a second set of clips (41, 42; 51, 52) configured for snap-fit connection of the vanity mirror assembly (1) onto the sun visor body (2) in a manner that does not prevent movement of the vanity mirror assembly (1) in relation to the sun visor body (2), the method comprising:
  bringing the vanity mirror assembly (1) into contact with the sun visor body (2) so that the vanity mirror assembly (1) is clip connected to the sun visor body (2) by a first snap-fit connection involving the second set of clips (41, 42; 51, 52) and a second snap-fit connection involving the first set of clips (31, 32), wherein the vanity mirror assembly is first connected to the sun visor body by the first snap-fit connection involving the second set of clips (41, 42; 51, 52) whereafter the vanity mirror assembly (1) is still moveable in relation to the sun visor body (2), and wherein the vanity mirror assembly (1) is thereafter further connected to the sun visor body (2) by the second snap-fit connection involving the first set of clips (31, 32), whereafter the vanity mirror assembly (1) is no longer moveable in relation to the sun visor body (2).

15. The sun visor according to claim 5, wherein the second set of clips (41, 42; 51, 52) are configured for allowing movement of the vanity mirror assembly (1) in relation to the sun visor body (2) with an amplitude in the range of 0.5-10 mm in a direction substantially perpendicular to the sun visor body (2), without deformation of the clips of the second set of clips.

16. The sun visor according to claim 5, wherein the second set of clips (41, 42; 51, 52) are configured for allowing movement of the vanity mirror assembly (1) in relation to the sun visor body (2) with an amplitude in the range of 1-5 mm in a direction substantially perpendicular to the sun visor body (2), without deformation of the clips of the second set of clips.

17. The sun visor according to claim 5, wherein the first set of clips (31, 32) are configured for biasing the vanity mirror assembly (1) against the sun visor body (2).

18. The sun visor according to claim 5, wherein the second set of clips (41, 42; 51, 52) are not configured for biasing the vanity mirror assembly (1) against the sun visor body (2).

19. The sun visor according to claim 5, wherein the clips (41, 42; 51, 52) of the second set of clips are more flexible than the clips of the first set of clips.

\* \* \* \* \*